Nov. 12, 1957     R. O. DECKER     2,813,247
PHASE SHIFTER FOR MOTOR CONTROL SYSTEMS AND THE LIKE
Filed March 9, 1956
Fig. I.
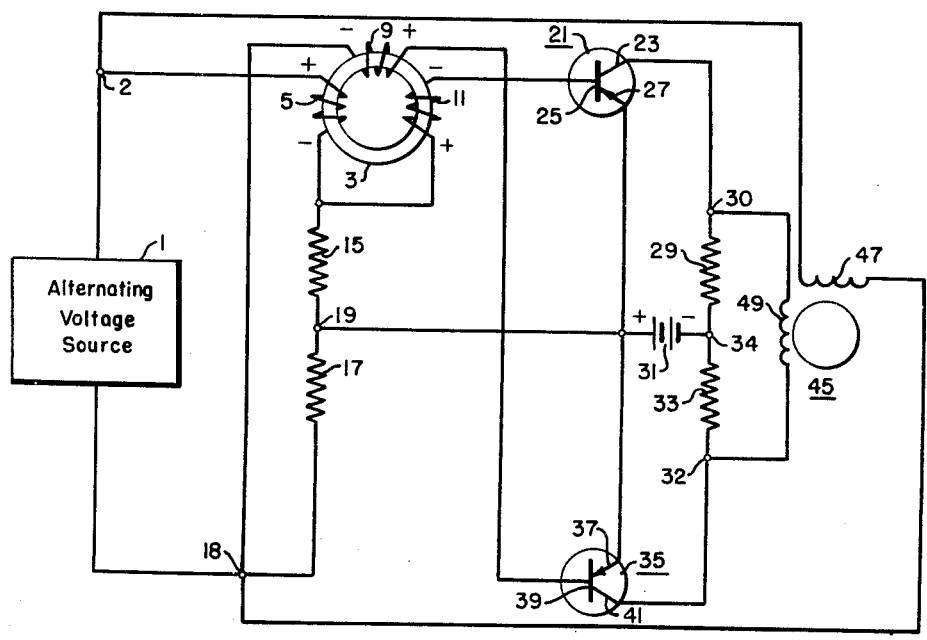
Fig. 2.
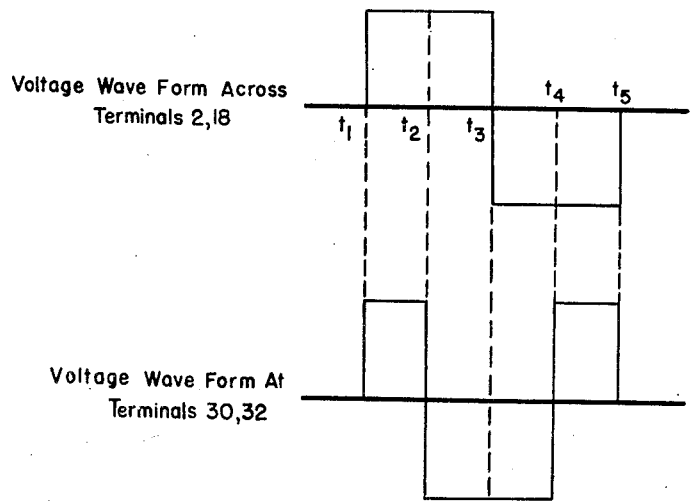
WITNESSES:
INVENTOR
Richard O. Decker
BY
ATTORNEY

United States Patent Office 2,813,247
Patented Nov. 12, 1957

2,813,247

PHASE SHIFTER FOR MOTOR CONTROL SYSTEMS AND THE LIKE

Richard O. Decker, Murrysville, Pa., assignor to Westinghouse Electric Corporation, East Pittsburgh, Pa., a corporation of Pennsylvania Application March 9, 1956, Serial No. 570,575

6 Claims. (Cl. 323—127)

This invention relates to phase shifting circuits and, more particularly, to phase shifting circuits for use with motor control systems.

The speed of a two phase hysteresis type motor may be controlled by varying the frequency of the alternating current supply source providing the power therefor. The speed of a hysteresis motor is proportional to frequency and nearly independent of load and may be controlled from a single supply source provided that the voltage applied to the control and reference phases of the motor are shifted by 90°. While the motor will function when the voltages differ in phase from 90°, optimum operation of the motor is achieved with a 90° phase shift. Furthermore, this phasic relationship must be maintained over a wide range of frequencies if the speed of the motor is to be made directly proportional to the frequency.

It has been known in the prior art to use relatively simple reactive devices to achieve the desired phasic relationship between the voltage applied to the control and reference phases of the two phase motor or to use very complicated compensating circuits employing a multitude of electronic tubes. Obviously, simple reactive devices can provide the desired amount of phase shift at only a single frequency. While the relatively complicated compensating circuits will function over a band of frequencies, this band of frequencies has been found to be relatively narrow. In certain control applications it is desirable to use a rectangular wave supply voltage for the motor and such circuits are incapable of passing the various sinusoidal components of a rectangular wave without varying degrees of phase shift. Furthermore, the complexity of these control circuits makes them rather expensive and not at all reliable in operation, particularly in view of the fact that they necessarily require the use of electronic valves.

One object of this invention is to provide a simple reliable phase shifting network requiring an absolute minimum of periodic maintenance.

Another object is to provide a phase shifting network that will maintain a constant phase shift over a wide frequency range.

Still another object is to provide an improved phase shifting network for use in the control of two phase motors by variation of the frequency of the power source of the motor.

Other objects and features of the invention will become apparent upon consideration of the following description thereof when considered in connection with the accompanying drawings, wherein:

Figure 1 is a schematic diagram of a typical embodiment of this invention; and

Fig. 2 are waveform representations of the input and output voltage of the phase shifting network depicted in Fig. 1, which waveform representations are useful in the understanding of the operation of the network.

According to one aspect of this invention, a direct voltage source is switched between a pair of output terminals in accordance with the polarity of an alternating voltage control signal source so that the polarity of the signal appearing across the output terminals reverses with each reversal in polarity of the control signal. The voltage wave form of each half cycle of the control signal is substantially rectangular and of constant volt second area. The control signal is inductively coupled to a ferromagnetic core, having a rectangular loop hysteresis characteristic, by a pair of serially connected resistance means so that the core is driven to saturation in opposite senses on successive half cycles of the control signal, most of the voltage of the control signal appearing on each half cycle across the coupling winding before saturation and across the resistance means after saturation. Each resistance means is connected to the contact terminals of a controlled switch respectively associated therewith (such as a switching transistor) by a respective output winding on the core. The two switches are alternately rendered conducting and non-conducting in opposition before saturation on successive half cycles of the signal source by the voltages induced across the respective output winding associated therewith. The switches are further alternately rendered conducting and non-conducting in opposition by the voltages appearing across the resistance means associated therewith. Each switch is rendered conducting by the output winding associated therewith before saturation on alternate half cycles immediately after having been rendered conducting on the preceding half cycle by the resistance means associated therewith. Thus, when the switches are utilized to reverse the polarity of the direct voltage source across the output terminals of the phase shifting circuit, the output voltage will differ in phase from the signal voltage in accordance with the time interval required by the core to reach saturation.

In more particular, and with reference to Fig. 1, a ferromagnetic core 3 is coupled to alternating voltage source 1 by means of a winding 5 inductively associated with the core, serially connected resistance means 15 and 17 connecting winding 5 across the output terminals 2 and 18 of alternating voltage source 1. Ferromagnetic core 3 is preferably of the type having a rectangular loop hysteresis characteristic such as Hipernik V or Deltamax. Alternating voltage source 1 must have a rectangular loop output voltage of constant volt-second area on each half cycle. Such an alternating voltage source is described in the copending application of R. L. Bright et al., Serial No. 421,350, filed April 6, 1954, and issued February 26, 1957, as Patent No. 2,783,384. This alternating voltage source provides an output voltage, each half cycle of which has constant volt area, and the frequency of which is proportional to the magnitude of a D. C. voltage supplied thereto.

Two-phase hysteresis motor 45 having a reference phase 47 and a control phase 49 is provided, reference phase 47 being connected across terminals 2 and 18 of alternating voltage source 1. Phase 49 is connected across the outer terminals 30 and 32 of output impedance means 29 and 33 which preferably are a pair of resistors. A voltage source 31 is connected between common terminal 19 of resistance means 15 and 17 and common terminal 34 of resistance means 29 and 33, the negative terminal of the direct voltage source 31 being connected to terminal 34. This direct voltage source supplies emitter-collector bias potential for switching transistor 21, emitter 27 being connected to the positive terminal of the direct voltage source and collector 23 being connected to resistor terminal 30. The source further supplies emitter-collector bias potential for switching transistor 35, the collector 41 of which is connected to resistor terminal 32.

The function of switching transistor 21 is to connect the direct voltage source 31 across impedance means 29 and the function of switching transistor 35 is to connect the direct voltage source across impedance 33. Thus, the polarity of the voltage appearing across terminals 30 and 32 is dependent upon which of the switching transistors is rendered conducting at any given time. The switching transistors are preferably of the junction type and are here shown as P–N–P junction transistors.

The function of the ferromagnetic core 3, the various windings 5, 9 and 11 associated therewith, and the resistance means 15 and 17 is to switch transistors 21 and 35 from the conductive to their non-conductive states oppositely and in alternation in accordance with a predetermined sequence dependent upon the length of time required for alternating voltage source 1 to drive the core 3 to saturation. This is accomplished by serially connecting winding 11 and resistance means 15 between base 25 and emitter 27 of transistor 21 and serially connecting output winding 9 and resistance means 17 between base 39 and emitter 37 of transistor 35. The windings are so connected that with current flowing from terminal 2 through winding 5 to terminal 18, voltages are induced across windings 9 and 11 before saturation of core 3 that will place base 25 at a negative potential with respect to emitter 27 and base 39 at a positive potential with respect to emitter 37. Instantaneous polarities of voltages across the various windings are shown on the drawing.

The operation of the circuitry described above will now be explained with reference to the wave-form representations of Fig. 2. At an instant $t_1$, at the beginning of a positive half cycle of the output voltage of alternating voltage source 1, whereat terminal 2 is positive with respect to terminal 18, a current will flow through winding 5 and resistance means 15 and 17. Most of the output voltage of source 1 will appear across winding 5 so that the voltages induced across windings 9 and 11 will be of magnitudes large in comparison to the voltages across resistors 15 and 17. Switching transistor 21 will be rendered conducting so that a positive voltage appears across output impedance 29 and therefore across the control phase 49 of motor 45. When core 3 reaches saturation at instant $t_2$, the voltages across windings 9 and 11 will collapse, and simultaneously therewith the voltages across resistance means 15 and 17 will increase considerably in magnitude since the impedance of winding 5 will drop to substantially zero. Base 25 will be at a positive potential with respect to emitter 27 and base 39 will be negative with respect to emitter 37 so that transistor 21 is rendered non-conducting and transistor 35 is rendered conducting. Voltage source 31 will be coupled across impedance means 33 so that output terminal 30 is negative with respect to terminal 32 and the voltage across control phase 39 will thus reverse in polarity.

At the instant $t_3$, the end of the positive half cycle of source 1, the voltage will reverse so that terminal 18 is positive with respect to terminal 2. Core 3 will now be driven to saturation in the opposite direction so that the voltages appearing across windings 11 and 9 will respectively render transistor 35 conducting and transistor 21 non-conducting. Thus, terminal 30 will remain negative with respect to terminal 32 and the voltage appearing across control phase 49 will remain of the same polarity as prevailed after saturation on the preceding half cyle of the source 1. At instant $t_4$, core 3 will saturate in a negative direction, and the voltages across windings 9 and 11 will again collapse and the voltages now appearing across resistance means 15 and 17 will respectively render transistor 21 conducting and transistor 35 non-conducting. Voltage source 31 will again be connected across impedance means 29 and output terminal 30 will be positive with respect to output terminal 32 so that the voltage appearing across control phase 49 will reverse in polarity.

From the above description, it will readily be apprehended that the output voltage appearing across terminals 30 and 32 will be displaced in phase from the voltage appearing across terminals 2 and 18 by an amount dependent upon the time required for core 3 to be driven to saturation. As long as the volt-second area of the output voltage wave form of source 1 remains constant, the phase shift between the output voltage appearing across terminals 30 and 32 and the voltage appearing across terminals 2, 18 will remain constant.

While the phase shifting device described above has been depicted in connection with a motor control system, it should be apparent that the phase shifter per se may be used in other applications. Examples would be the use of the device to convert a single-phase square-wave voltage to a three-phase square-wave voltage, the phase shifter being utilized to shift the input voltage by 60° and 120° for the additional phases. The phase shifting circuit has been found to respond to signals having square-wave frequencies of from 100 to 1000 cycles per second without loss of fidelity and it is believed that this range of frequencies can be considerably increased before loss of fidelity will be noted. The circuit is quite simple and has been found to be extremely reliable in operation inasmuch as only static, non-thermionic components are utilized.

The following table lists typical values of component parts which have been found to be entirely satisfactory in operation, although it is to be understood that other values may be used and that the values given are not to be interpreted in a limiting sense.

Component reference numeral:
    Core 5 _____ ¾″ inside diameter;
                                      1″ outside diameter;
                                        ¼″ height.
    Resistors 15 and 17 _____ 1000 ohms each.
    Resistors 29 and 33 _____ 500 ohms each.
    D. C. source 31 _____ 30 volts.
    Windings 5, 9 and 11 _____ 1000 turns each.
    Transistors 21 and 35 _____ Type 2N73.

The invention is not to be restricted to the structural details, arrangement of parts or circuit connections herein set forth as various modifications thereof may be effected without departing from the spirit and scope of the invention.

I claim as my invention:

1. Apparatus for shifting the output voltage of an alternating voltage source having a rectangular-wave output voltage wave form of constant volt-second area, comprising a high resonance magnetic core having first, second, and third windings in inductive relationship therewith; a source of direct voltage; first and second junction transistor means each having emitter, collector, and base electrodes; first and second impedance means respectively coupling said direct voltage source to said first and second transistor means; third and fourth serially connected impedance means coupling and first winding means to said alternating voltage source; said second winding means coupling said base and emitter electrodes of said first transistor means to said third impedance means operative to saturate collector current flow of said first transistor means prior to saturation of said core on first alternate half cycles of said alternating voltage source and cut off said collector current flow on second alternate half cycles prior to saturation of said core; the voltage appearing across said third impedance means being operative to cut off collector current flow through said first transistor means after saturation of said core on said first half cycles and to render said first transistor conductive after saturation of said core during said second half cycles; said third winding means coupling said base and emitter electrodes of said second transistor to said fourth impedance means adapted to cut off collector current in said second transistor prior to saturation of said core during said second half cycles and to render said second transistor conductive prior to saturation during said first half cycles; the voltage appearing across said fourth impedance means being operative to cut off collector current in said second transistor after core saturation during said second alternate half cycles and to render said second transistor conductive after core saturation during said first alternate half cycles.

2. Apparatus for shifting the output voltage of an alternating voltage source having a rectangular-wave output voltage wave form of constant volt-second area, comprising a high resonance magnetic core having first, second, and third windings in inductive relationship therewith; a source of direct voltage; first and second junction transistor means each having emitter, collector, and base electrodes; first and second impedance means respectively coupling said direct voltage source to said first and second transistor means; third and fourth serially connected impedance means coupling said first winding means to said alternating voltage source; said second winding means coupling said base and emitter electrodes of said first transistor means to said third impedance means operative to saturate collector current flow of said first transistor means prior to saturation of said core on first alternate half cycles of said alternating voltage source and cut off said collector current flow on second alternate half cycles prior to saturation of said core; said alternating voltage source, by virtue of the portion of the output voltage thereof appearing across said third impedance means, being operative to cut off collector current flow through said first transistor means after saturation of said core on said first half cycles and to render said first transistor conductive after saturation of said core during said second half cycles; said third winding means coupling said base and emitter electrodes of said second transistor to said fourth impedance means adapted to cut off collector current in said second transistor prior to saturation of said core during said second half cycles and to render said second transistor conductive prior to saturation during said first half cycles; said alternating voltage source, by virtue of the portion of the output voltage thereof appearing across said fourth impedance means, being operative to cut off collector current in said second transistor after core saturation during said second alternate half cycles and to render said second transistor conductive after core saturation during said first alternate half cycles.

3. Apparatus for shifting the output voltage of an alternating voltage source, comprising magnetic core means having first, second, and third winding means in inductive relationship therewith; direct voltage source means; first and second serially connected output impedance means, the output of said apparatus being taken across the outer terminals of said serially connected impedance means; first and second switch means for respectively coupling said voltage source means across said first and second output impedance means; first means coupling said first winding means to said alternating voltage source to saturate said core in opposite senses on successive half cycles of said alternating voltage source; second means including said first means and said second winding means for rendering said first switch means conducting prior to saturation of said core on first alternate half cycles of said alternating voltage source and after saturation of said core on second alternate half cycles of said alternating voltage source, and to render said first switch non-conducting after saturation of said core on said first alternate half cycles and prior to saturation of said core on said second alternate half cycles; third means including said first means and said third winding means for rendering said second switch means non-conducting prior to saturation of said core on said first alternate half cycles and after saturation of said core on said second alternate half cycles and for rendering said second switch conducting after saturation of said core on said second half cycles.

4. Apparatus for shifting the output voltage of an alternating voltage source, comprising magnetic core means having first, second, and third winding means in inductive relationship therewith; direct voltage source means; first and second serially connected output impedance means, the output of said apparatus being taken across the outer terminals of said serially connected impedance means; first and second switch means for respectively coupling said direct voltage source means across said first and second output impedance means; third and fourth serially connected impedance means coupling said first winding means to said alternating voltage source to saturate said core in opposite senses on successive half cycles of said alternating voltage source; second means including said third impedance means and said second winding means for rendering said first switch means conducting prior to saturation of said core on first alternate half cycles of said alternating voltage source and after saturation of said core on second alternate half cycles of said alternating voltage source, and to render said first switch non-conducting after saturation of said core on said first alternate half cycles and prior to saturation of said core on said second alternate half cycles; third means including said fourth impedance means and said third winding means for rendering said second switch means non-conducting prior to saturation of said core on said first alternate half cycles and after saturation of said core on said second alternate half cycles and for rendering said second switch conducting after saturation of said core on said second half cycles.

5. Apparatus for shifting the output voltage of an alternating voltage source, comprising a direct voltage source; first and second serially connected output impedance means; magnetic core means; first means for successively saturating said core means in opposite senses on successive half cycles of said alternating voltage source; second means coupled to said magnetic core means for coupling said direct voltage source across said first impedance means prior to saturation of said core on first alternate half cycles of said alternating voltage source and after saturation of said core on second alternate half cycles of said alternating voltage source, and for coupling said direct voltage source across said second impedance means after saturation of said core on said first alternate half cycles and prior to saturation of said core on said second alternate half cycles.

6. Apparatus for shifting the output voltage of an alternating voltage source, comprising a direct voltage source; first and second serially connected output impedance means; magnetic core means; first means for successively saturating said core means in opposite senses on successive half cycles of said alternating voltage source; second means coupled to said magnetic core means for coupling said direct voltage source across said first impedance means prior to saturation of said core on first alternate half cycles of said alternating voltage source and after saturation of said core on second alternate half cycles of said alternating voltage source, and third means coupled to said core coupling said direct voltage source across said second impedance means after saturation of said core on said first alternate half cycles and prior to saturation of said core on said second alternate half cycles.

No references cited.